US011140655B2

(12) United States Patent
Niemi et al.

(10) Patent No.: US 11,140,655 B2
(45) Date of Patent: Oct. 5, 2021

(54) GUTI ALLOCATION AFTER ESTABLISHMENT OF MOBILE-TERMINATED CONNECTION IN MOBILE COMMUNICATIONS

(71) Applicant: MediaTek Singapore Pte. Ltd., Singapore (SG)

(72) Inventors: Marko Niemi, Oulu (FI); Matti Moisanen, Oulu (FI)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/655,231

(22) Filed: Oct. 17, 2019

(65) Prior Publication Data
US 2020/0128509 A1 Apr. 23, 2020

Related U.S. Application Data

(60) Provisional application No. 62/746,581, filed on Oct. 17, 2018, provisional application No. 62/900,699, filed on Sep. 16, 2019.

(51) Int. Cl.
*H04W 68/00* (2009.01)
*H04W 72/04* (2009.01)
(Continued)

(52) U.S. Cl.
CPC ......... *H04W 68/005* (2013.01); *H04L 5/0055* (2013.01); *H04W 8/18* (2013.01); *H04W 72/04* (2013.01); *H04W 76/10* (2018.02)

(58) Field of Classification Search
CPC ...... H04W 68/00; H04W 68/005; H04W 8/18
See application file for complete search history.

(56) References Cited

U.S. PATENT DOCUMENTS

| 2008/0233947 A1* | 9/2008 | Herrero-Veron | H04W 8/00 455/422.1 |
| 2010/0173634 A1* | 7/2010 | Kato | H04W 36/0055 455/438 |

(Continued)

FOREIGN PATENT DOCUMENTS

| CN | 102281641 A | 12/2011 |
| CN | 102857897 A | 1/2013 |

(Continued)

OTHER PUBLICATIONS

China National Intellectual Property Administration, International Search Report and Written Opinion for PCT/CN2019/111654, dated Jan. 21, 2020.

(Continued)

*Primary Examiner* — Jinsong Hu
*Assistant Examiner* — Farideh Madani
(74) *Attorney, Agent, or Firm* — Han IP PLLC; Andy M. Han

(57) ABSTRACT

Examples pertaining to improved Globally Unique Temporary Identity (GUTI) allocation after establishment of mobile-terminated connection in mobile communications are described. An apparatus implemented in a UE receives a paging message from a network node of a wireless network. The apparatus then transmits a request to the network node responsive to receiving the paging message. In response to transmitting the request, the apparatus receives a signaling from the network node, with the signaling indicating a new temporary identity of the UE.

13 Claims, 9 Drawing Sheets

(51) Int. Cl.
    *H04W 76/10*     (2018.01)
    *H04L 5/00*     (2006.01)
    *H04W 8/18*     (2009.01)

(56) References Cited

U.S. PATENT DOCUMENTS

| | | | |
|---|---|---|---|
| 2014/0078890 | A1 | 3/2014 | Lu et al. |
| 2015/0103721 | A1* | 4/2015 | Yl .................... H04W 4/70 370/311 |
| 2017/0188280 | A1 | 6/2017 | Watfa et al. |
| 2018/0270786 | A1 | 9/2018 | Nair et al. |
| 2018/0324751 | A1* | 11/2018 | Hampel ............ H04W 76/11 |
| 2018/0324869 | A1* | 11/2018 | Phuyal ......... H04W 74/0833 |
| 2019/0037629 | A1* | 1/2019 | Ryu .................... H04W 8/08 |
| 2019/0150219 | A1* | 5/2019 | Wang ............... H04W 76/30 370/329 |
| 2019/0357295 | A1* | 11/2019 | Kim ................... H04L 5/0055 |
| 2019/0373441 | A1* | 12/2019 | Ryu .................. H04W 68/005 |
| 2020/0037243 | A1* | 1/2020 | Tamura ........... H04W 52/0216 |

FOREIGN PATENT DOCUMENTS

| | | |
|---|---|---|
| WO | WO 2018128529 A1 | 7/2018 |
| WO | WO 2018141255 A1 | 8/2018 |
| WO | WO 2018171310 A1 | 9/2018 |

OTHER PUBLICATIONS

Taiwan Intellectual Property Office, Office Action for Taiwan Patent Application No. 108137444, dated Aug. 17, 2020.

\* cited by examiner

GUTI ALLOCATION AFTER ESTABLISHMENT OF MOBILE-TERMINATED CONNECTION IN MOBILE COMMUNICATIONS

CROSS REFERENCE TO RELATED PATENT APPLICATION(S)

The present disclosure is part of a non-provisional application claiming the priority benefit of U.S. Patent Application No. 62/746,581, filed on 17 Oct. 2018, and U.S. Patent Application No. 62/900,699, filed on 16 Sep. 2019. Contents of aforementioned applications are herein incorporated by reference in their entirety.

TECHNICAL FIELD

The present disclosure is generally related to mobile communications and, more particularly, to improved Globally Unique Temporary Identity (GUTI) allocation after establishment of mobile-terminated connection in mobile communications.

BACKGROUND

Unless otherwise indicated herein, approaches described in this section are not prior art to the claims listed below and are not admitted as prior art by inclusion in this section.

The $3^{rd}$ Generation Partnership Project (3GPP) technical specification (TS) 33.501 species that an Access and Mobility management Function (AMF) of a 5th Generation (5G) mobile network shall allocate a new 5G-GUTI to a user equipment (UE) after establishment of a network-initiated connection. A current approach to meeting this requirement uses a generic UE configuration update procedure. However, there are two issues associated with the use of the generic UE configuration update procedure. Firstly, the service request for the establishment of the network-initiated connection is not bound to the generic UE configuration update procedure. That is, there is no guarantee that the generic UE configuration update procedure can be performed. Moreover, there is no guarantee that the generic UE configuration update procedure, if performed, is performed successfully. Secondly, as this approach involves performing an additional procedure, it inevitably adds signaling load and thereby increases processing load for both the UE and the network. There is, therefore, a need for a solution that can meet the requirement of allocation of a new 5G-GUTI to the UE without the aforementioned issues.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of an apparatus implemented in a UE receiving a paging message from a network node of a wireless network. The method may also involve the processor transmitting a request to the network node responsive to receiving the paging message. The method may further involve the processor receiving a signaling from the network node in response to the transmitting of the request, with the signaling indicating a new temporary identity of the UE.

In one aspect, a method may involve a processor of an apparatus implemented in a UE transmitting a request to a network node of a wireless network. The method may also involve the processor receiving a response from the network node in response to the transmitting of the request, with the response indicating a new temporary identity of the UE.

In one aspect, an apparatus may include a transceiver and a processor coupled to the transceiver. The transceiver may be configured to wirelessly communicate with a network node (e.g., gNB) of a wireless network (e.g., 5th Generation (5G) New Radio (NR) mobile network). The processor may be configured to receive, via the transceiver, a paging message from the network node. The processor may be also configured to transmit, via the transceiver, a request to the network node responsive to receiving the paging message. The processor may be further configured to receive, via the transceiver, a signaling from the network node responsive to the transmitting of the request, with the signaling indicating a new temporary identity of the UE.

It is noteworthy that, although description provided herein may be in the context of certain radio access technologies, networks and network topologies such as 5G/NR mobile networking, the proposed concepts, schemes and any variation(s)/derivative(s) thereof may be implemented in, for and by other types of radio access technologies, networks and network topologies such as, for example and without limitation, Evolved Packet System (EPS), Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT), Narrow Band Internet of Things (NB-IoT), and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to improved GUTI allocation after establishment of mobile-terminated connection in mobile communications. According to the present disclosure, a number of possible solutions may be implemented separately or jointly. That is, although these possible solutions may be described below separately, two or more of these possible solutions may be implemented in one combination or another.

Figure 1:
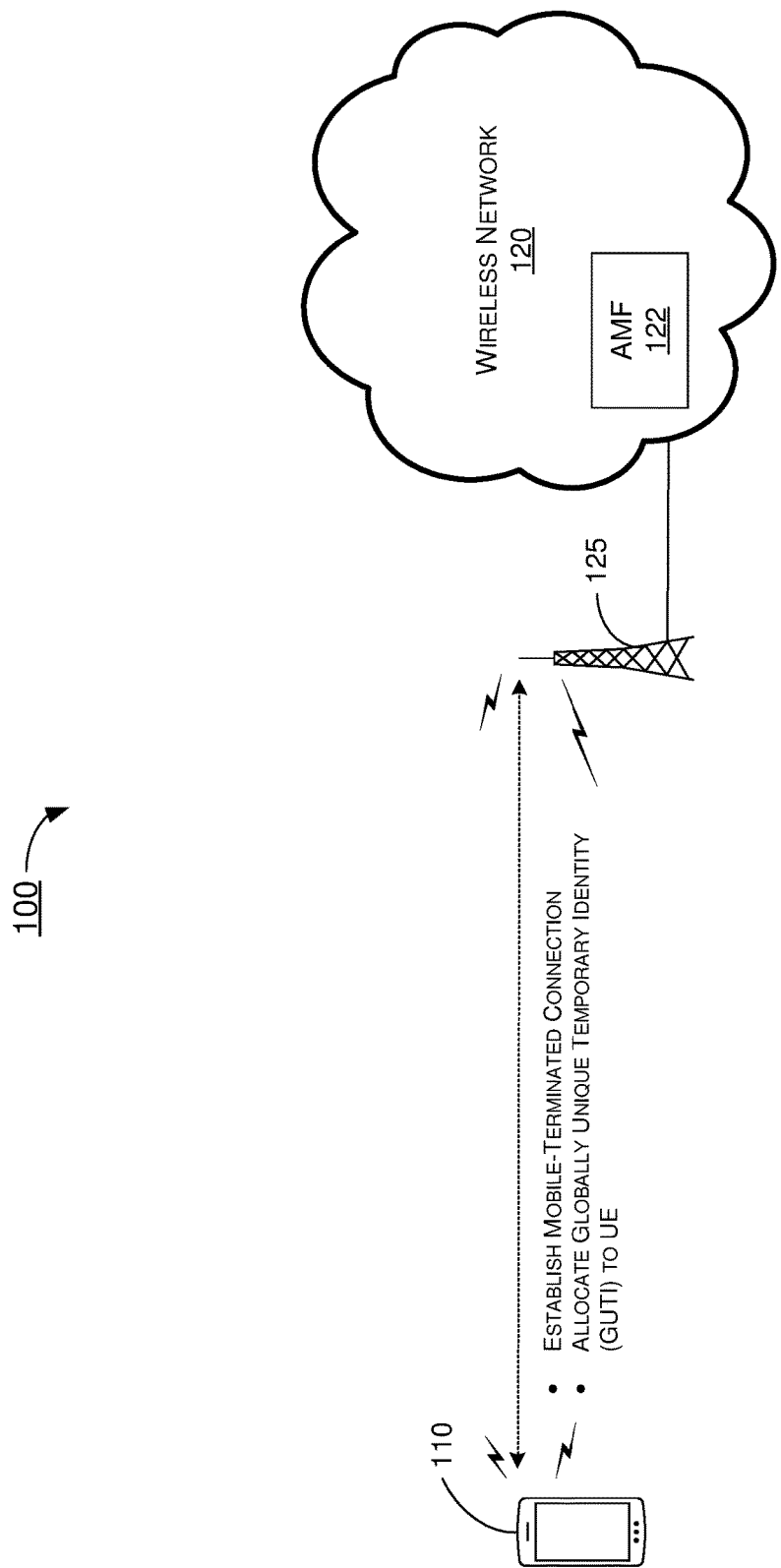
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 6 illustrate example scenarios 200, 300, 400, 500 and 600, respectively, in accordance with implementations of the present disclosure. Each of scenarios 200, 300, 400, 500 and 600 may be implemented in network environment 100. The following description of various proposed schemes is provided with reference to FIG. 1~FIG. 6.

Referring to FIG. 1, network environment 100 may involve a UE 110 in wireless communication with a wireless network 120 (e.g., a 5G NR mobile network). UE 110 may initially be in wireless communication with wireless network 120 via a base station or network node 125 (e.g., an eNB, gNB or transmit-receive point (TRP)) with connection and mobility management tasks handled by an Access and Mobility Management Function (AMF) 122 of wireless network 120. In network environment 100, UE 110 and wireless network 120 may implement various schemes pertaining to improved GUTI allocation after establishment of mobile-terminated connection in mobile communications in accordance with the present disclosure, as described herein.

Under a proposed scheme in accordance with the present disclosure, allocation of a new temporary identity for 5G system (5GS) mobility to UE 110 by wireless network 120 may be combined with a service request procedure. The new identity may be, for example and without limitation, a new 5G Globally Unique Temporary Identity (5G-GUTI), a new 5G Temporary Mobile Subscriber Identity (5G-TMSI) or a new 5G Serving Temporary Mobile Subscriber Identity (5G-S-TMSI). Under the proposed scheme, the new and temporary 5GS mobility identity may be included in a SERVICE ACCEPT protocol data unit (PDU), transmitted from wireless network 120 to UE 110, as a new optional information element (IE). The new and temporary 5GS mobility identity may also be included in a SERVICE REJECT PDU in cases in which UE 110 is not deregistered due to that reject.

As an illustrative example and without limiting the scope of the present disclosure, the format and size of the new and temporary 5GS mobility identity may be as follows: <5G-GUTI>=<GUAMI><5G-TMSI>, where <GUAMI>=<MCC><MNC><AMI Identity>. In this example, "GUAMI" stands for globally unique AMI identity, "MCC" stands for mobile country code, and "MNC" stands for mobile network code.

Under the proposed scheme, in an event that signaling of 5G-GUTI is not necessary, wireless network 120 may include only a new 5G-TMSI or 5G-S-TMSI in the PDU (whether SERVICE ACCEPT PDU or SERVICE REJECT PDU) for optimized signal size. Upon receiving the PDU, UE 110 may replace the 5G-TMSI or 5G-S-TMSI part of an old 5G-GUTI with the new 5G-TMSI or 5G-S-TMSI. This may be feasible since, in case of service request procedure and the AMF 122 does not change, the Public Land Mobile Network (PLMN) part and AMF part of the 5G-GUTI does not change.

Figure 2:
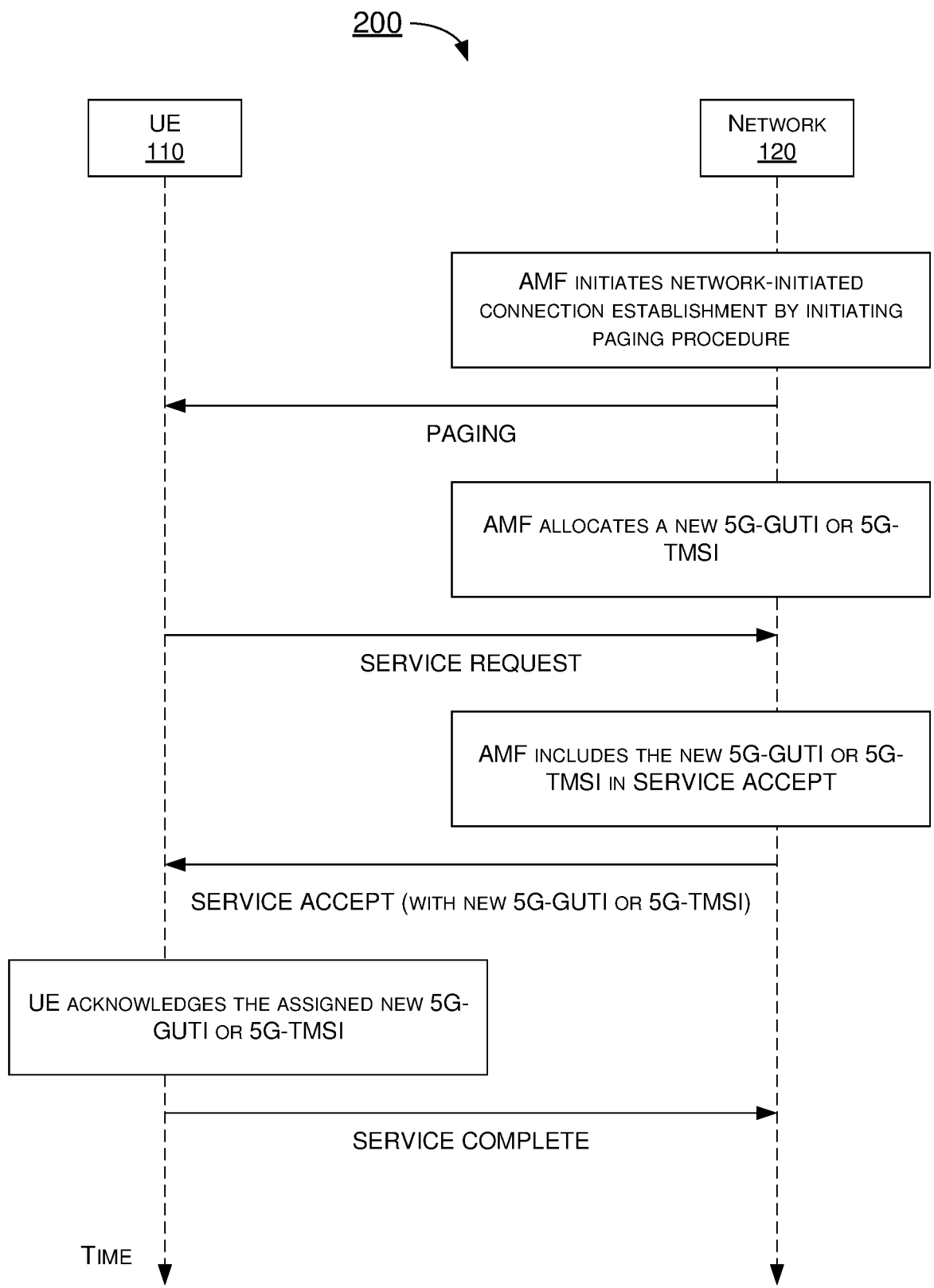
FIG. 2 shows a table of an example scenario in accordance with an implementation of the present disclosure.

Under the proposed scheme, in an event that wireless network 120 transmits a new 5G-GUTI or 5G-TMSI in a SERVICE ACCEPT PDU or SERVICE REJECT PDU, UE 110 may acknowledge with a new PDU (e.g., SERVICE COMPLETE PDU) to indicate to wireless network 120 that the new identity has been received. An example is shown in scenario 200 of FIG. 2. Referring to FIG. 2, AMF 122 of wireless network 120 may initiate establishment of a network-initiated connection with UE 110 by initiating a paging procedure. AMF 122 may also allocate a new identity for UE 110 (e.g., a new 5G-GUTI, 5G-TMSI or 5G-S-TMSI). UE 110 may reply with a SERVICE REQUEST upon receiving paging from wireless network 120. AMF 122 may include the new identity in a SERVICE ACCEPT PDU transmitted from wireless network 120 to UE 110. UE 110 may acknowledge the assigned new identity by transmitting a SERVICE COMPLETE PDU to wireless network 120.

Under the proposed scheme, in an event that the new identity is allocated using a SERVICE ACCEPT message, UE 110 may need not reply with a SERVICE COMPLETE message. For instance, when wireless network 120 has transmitted the new identity to UE 110 in a SERVICE ACCEPT message, AMF 122 may assume that UE 110 has received the new identity even without receiving an acknowledgement from UE 110.

Under the proposed scheme, UE 110 may implicitly acknowledge reception of the new identity. For instance, UE 110 may replace the old identity with the new identity. Under the proposed scheme, UE 110 may explicitly acknowledge reception of the new identity. For instance, UE 110 may include the new identity in future Access Stratum (AS) and/or Non-Access Stratum (NAS) signaling.

Under the proposed scheme, for possible error cases (e.g., due to transmission failure), AMF 122 may store the previous or old valid 5G-GUTI of UE 110 until UE 110 transmits the next uplink (UL) NAS PDU with the new 5G-GUTI. In such cases, AMF 122 may delete the old 5G-GUTI when AMF 122 determines that UE 110 has received the new 5G-GUTI (by implicit or explicit acknowledgement from UE 110). For instance, in the case of implicit acknowledgement, AMF 122 may determine that UE 110 has received the new 5G-GUTI when AMF 122 receives from UE 110 an UL PDU without the new 5G-GUTI over a same signaling connection. In the case of explicit acknowledgement, AMF 122 may determine that UE 110 has received the new 5G-GUTI when AMF 122 receives from UE 110 an initial NAS PDU with the new 5G-GUTI.

Under the proposed scheme, instead of using SERVICE ACCEPT, AMF 122 may trigger a configuration update command procedure to provide the new identity to UE 110. In such cases, UE 110 may treat the reception of a CONFIGURATION UPDATE COMMAND message as successful completion of the service request procedure.

Figure 3:
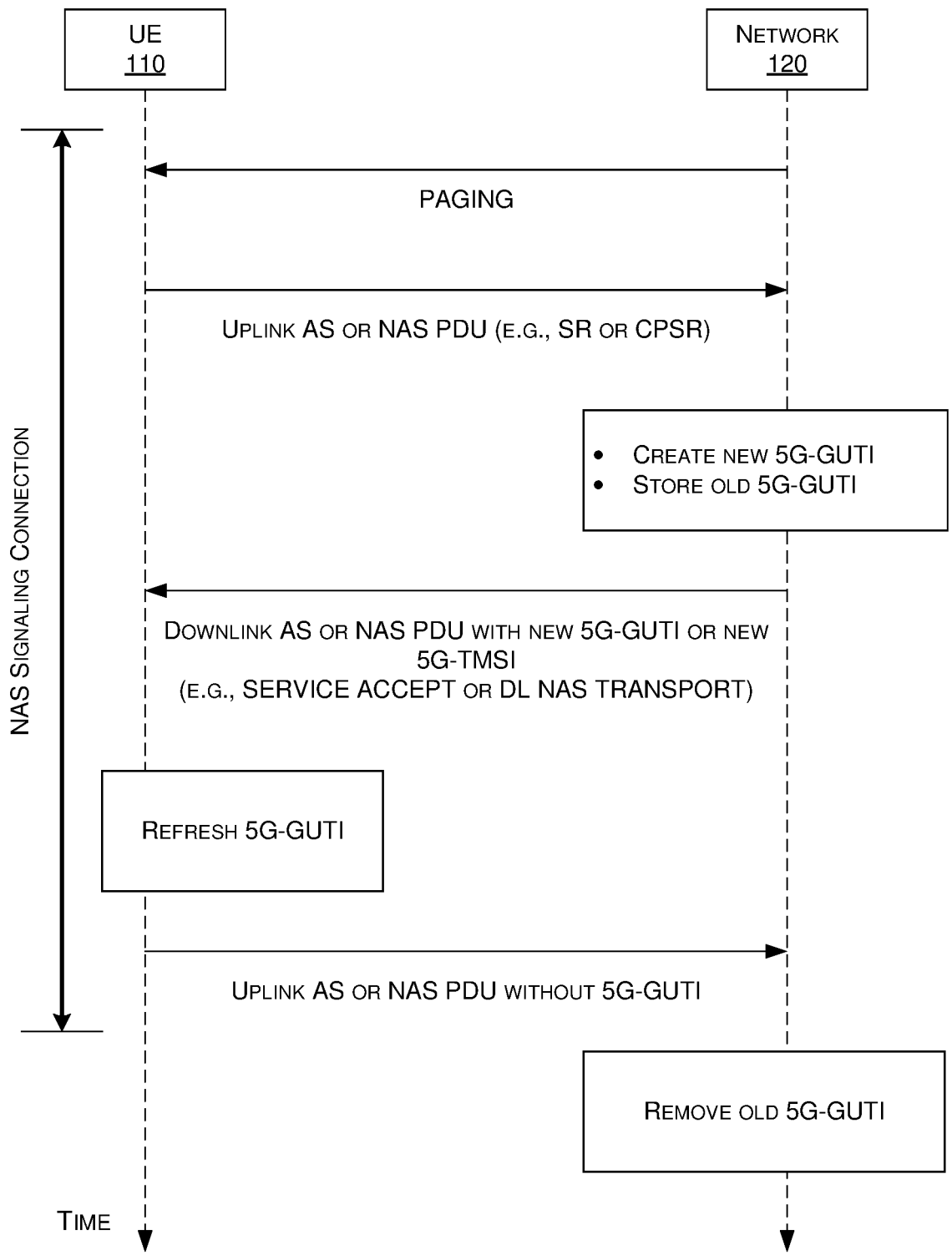
FIG. 3 shows a table of an example scenario in accordance with an implementation of the present disclosure.

Scenario 300 shows an example of implicit acknowledge by UE 110 regarding receipt of a new identity in accordance with an implementation of the present disclosure. Referring to FIG. 3, AMF 122 of wireless network 120 may initiate establishment of a network-initiated connection with UE 110 by initiating a paging procedure. UE 110 may reply with an UL AS or NAS PDU (e.g., SERVICE REQUEST (SR) or a CONTROL PLANE SERVICE REQUEST (CPSR)) upon receiving paging from wireless network 120. AMF 122 may create and allocate a new identity for UE 110 (e.g., a new 5G-GUTI, 5G-TMSI or 5G-S-TMSI) and then include the new identity in a DL AS or NAS PDU (e.g., SERVICE ACCEPT or DL NAS TRANSPORT) transmitted from wireless network 120 to UE 110. UE 110 may refresh its 5G-GUTI by replacing the old one with the new one. UE 110 may transmit an UL AS or NAS PDU to wireless network 120 without the new identity. In scenario 300, the above-described communications between wireless network 120 and UE 110 may occur under one and the same NAS signaling connection. Additionally, AMF 122 may remove the old identity of UE 110 from its memory or data storage.

Figure 4:
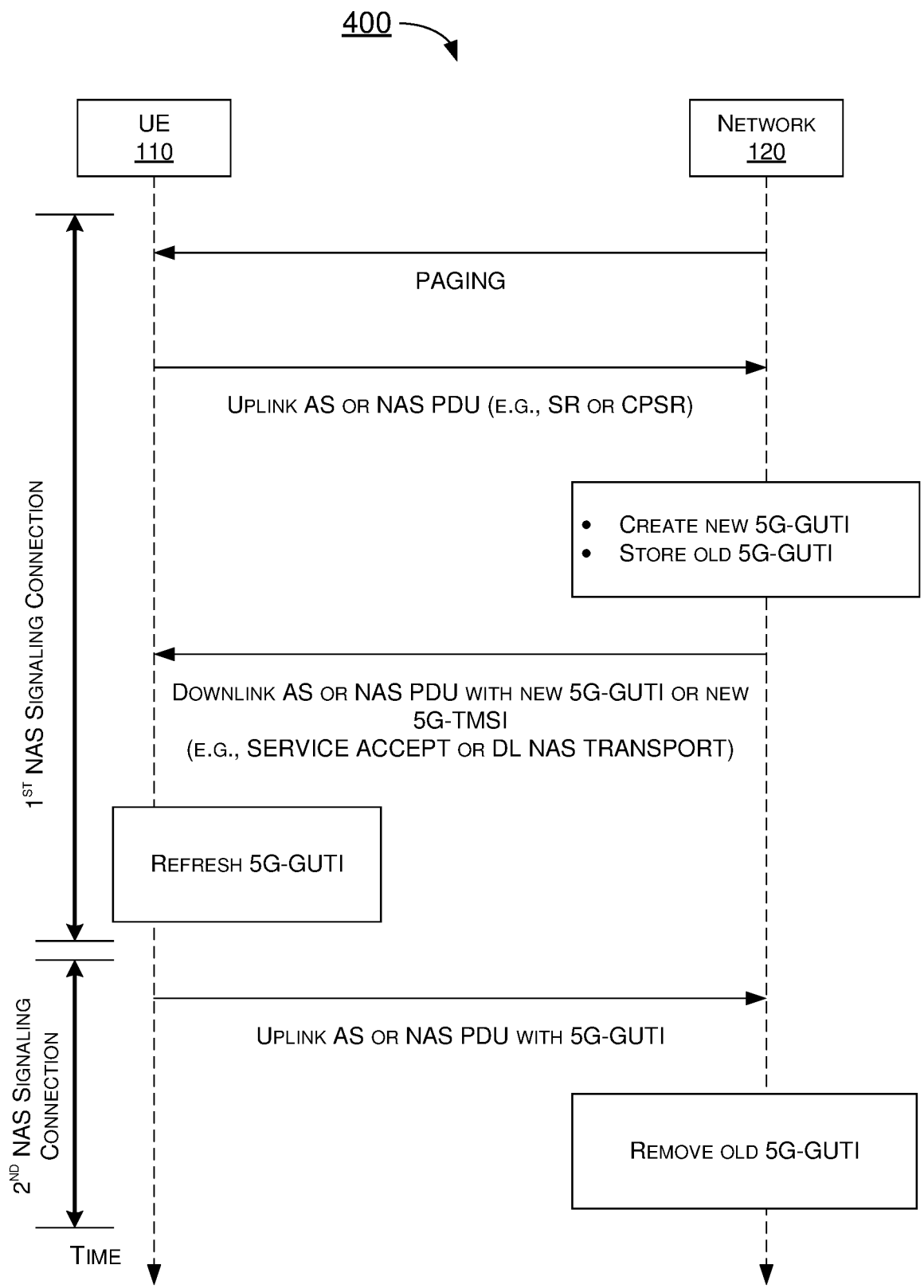
FIG. 4 shows a table of an example scenario in accordance with an implementation of the present disclosure.

Scenario 400 shows an example of explicit acknowledge by UE 110 regarding receipt of a new identity in accordance with an implementation of the present disclosure. Referring to FIG. 4, AMF 122 of wireless network 120 may initiate establishment of a network-initiated connection with UE 110 by initiating a paging procedure. UE 110 may reply with an UL AS or NAS PDU (e.g., SERVICE REQUEST or a control plane service request (CPSR)) upon receiving paging from wireless network 120. AMF 122 may create and allocate a new identity for UE 110 (e.g., a new 5G-GUTI, 5G-TMSI or 5G-S-TMSI) and then include the new identity in a DL AS or NAS PDU (e.g., SERVICE ACCEPT or DL NAS TRANSPORT) transmitted from wireless network 120 to UE 110. UE 110 may refresh its 5G-GUTI by replacing the old one with the new one. UE 110 may transmit an UL AS or NAS PDU to wireless network 120 with the new identity. In scenario 400, the above-described communications between wireless network 120 and UE 110 up to and before the acknowledgement by UE 110 may occur under a first NAS signaling connection while the transmission of the UL AS or NAS PDU as acknowledgement by UE 110 may occur under a second NAS signaling connection which is different from the first NAS signaling connection. Additionally, AMF 122 may remove the old identity of UE 110 from its memory or data storage.

Figure 5:
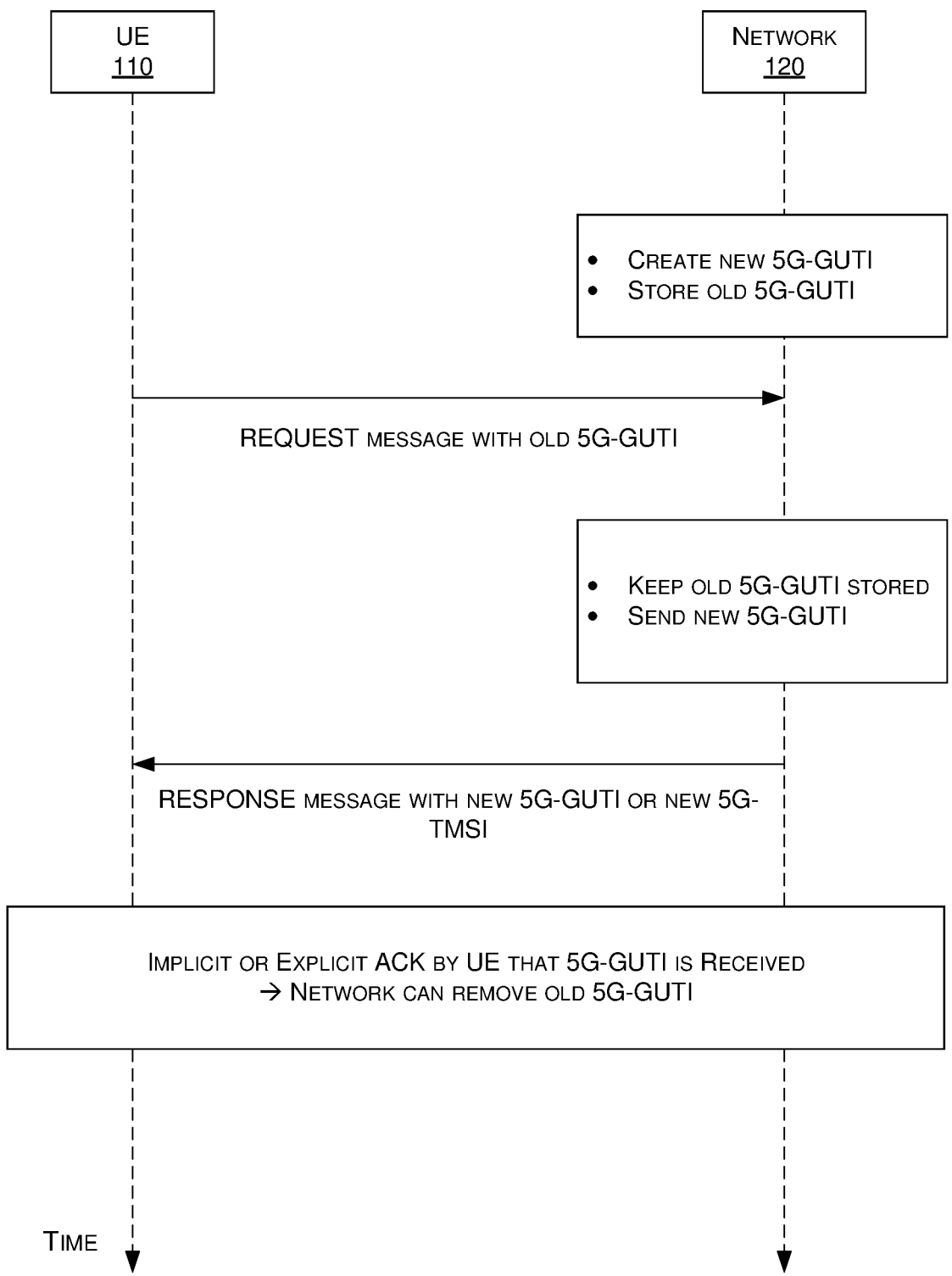
FIG. 5 shows a table of an example scenario in accordance with an implementation of the present disclosure.

Scenario 500 shows an example of recovery from error cases in accordance with an implementation of the present disclosure. Referring to FIG. 5, in scenario 500, AMF 122 of wireless network 120 may create a new identity for UE 110 (e.g., a new 5G-GUTI, 5G-TMSI or 5G-S-TMSI) and store the new identity along with an old identity of UE 110. AMF 122 may then receive a REQUEST message (e.g., a SERVICE REQUEST or CPSR) from UE 110. AMF 122 may include the new identity in a RESPONSE message transmitted from wireless network 120 to UE 110 while still keeping the old identity of UE 110 stored. Upon receiving the RESPONSE message, UE 110 may acknowledge receipt of the new identity by one of the ways described herein. In response, AMF 122 may remove the old identity of UE 110 from memory/storage so that it is no longer stored.

Figure 6:
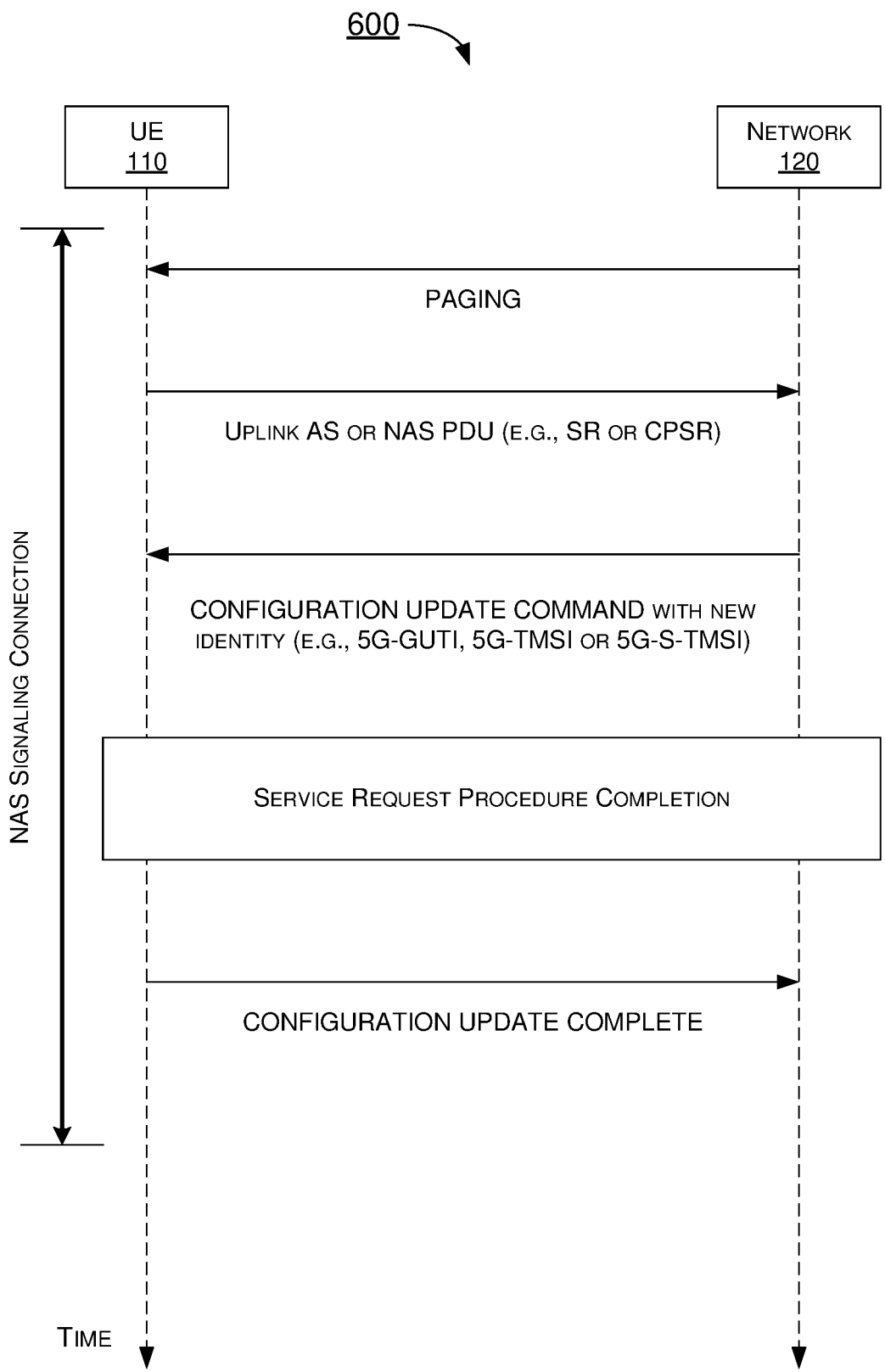
FIG. 6 shows a table of an example scenario in accordance with an implementation of the present disclosure.

Scenario 600 shows an example of a configuration update procedure in accordance with an implementation of the present disclosure. Referring to FIG. 6, AMF 122 of wireless network 120 may initiate establishment of a network-initiated connection with UE 110 by initiating a paging procedure. UE 110 may reply with an UL AS or NAS PDU (e.g., SR or a CPSR) upon receiving paging from wireless network 120. AMF 122 may create and allocate a new identity for UE 110 (e.g., a new 5G-GUTI, 5G-TMSI or 5G-S-TMSI) and then include the new identity in a CONFIGURATION UPDATE COMMAND message transmitted from wireless network 120 to UE 110. In response, UE 110 may perform and complete the service request procedure. UE 110 may transmit a CONFIGURATION UPDATE COMPLETE message to wireless network 120 without the new identity. In scenario 300, the above-described communications between wireless network 120 and UE 110 may occur under one and the same NAS signaling connection.

Illustrative Implementations

Figure 7:
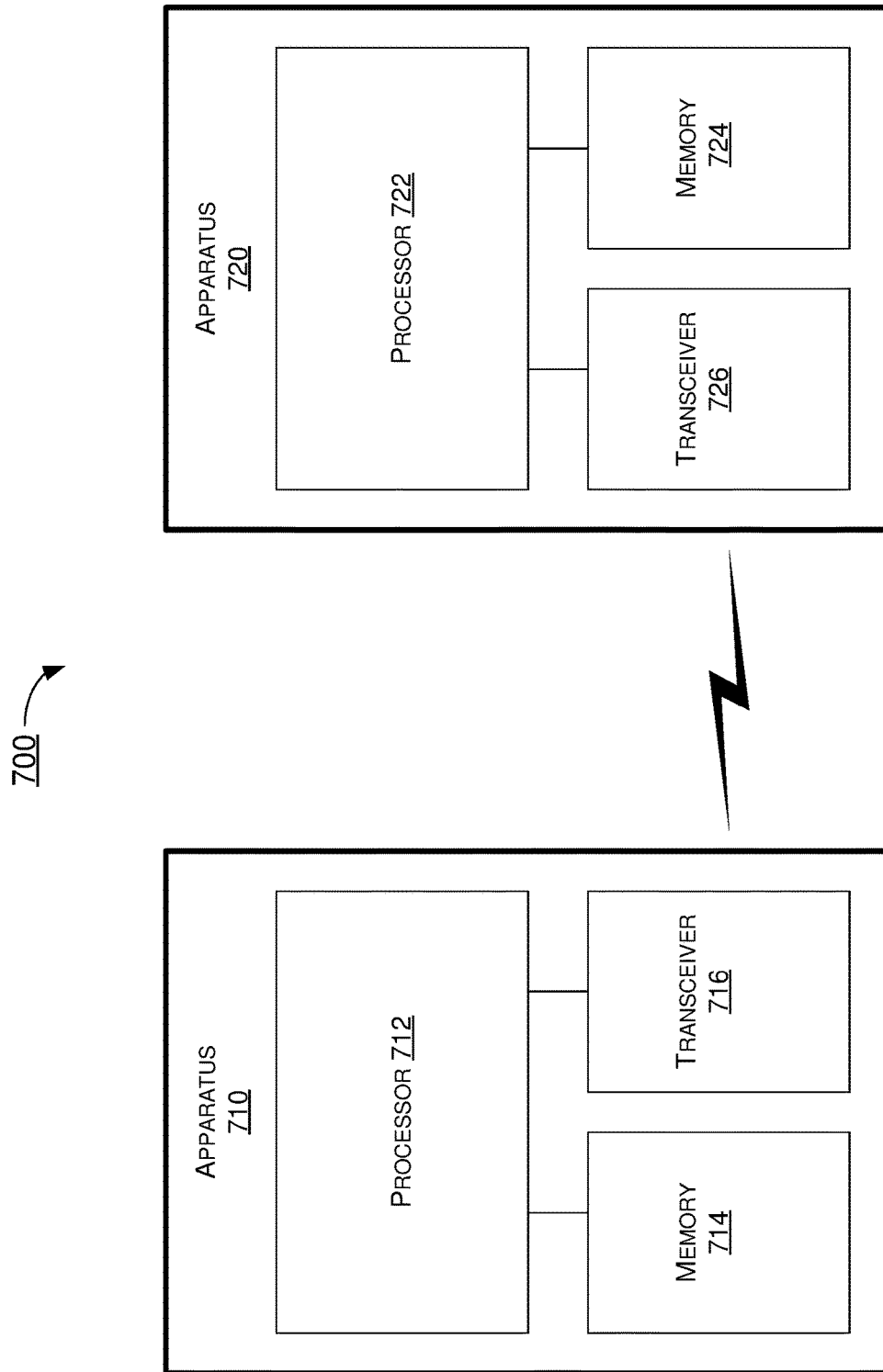
FIG. 7 is a block diagram of an example communication system in accordance with an implementation of the present disclosure.

FIG. 7 illustrates an example communication system 700 having at least an example apparatus 710 and an example apparatus 720 in accordance with an implementation of the present disclosure. Each of apparatus 710 and apparatus 720 may perform various functions to implement schemes, techniques, processes and methods described herein pertaining to improved GUTI allocation after establishment of mobile-terminated connection in mobile communications, including the various schemes described above with respect to various proposed designs, concepts, schemes, systems and methods described above, including network environment 100, as well as processes described below.

Each of apparatus 710 and apparatus 720 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 710 and apparatus 720 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 710 and apparatus 720 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 710 and apparatus 720 may be implemented in a smart thermostat, a smart fridge, a smart door lock, a wireless speaker or a home control center. When implemented in or as a network apparatus, apparatus 710 and/or apparatus 720 may be implemented in an eNodeB in an LTE, LTE-Advanced or LTE-Advanced Pro network or in a gNB or TRP in a 5G network, an NR network or an IoT network.

In some implementations, each of apparatus 710 and apparatus 720 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 710 and apparatus 720 may be implemented in or as a network apparatus or a UE. Each of apparatus 710 and apparatus 720 may include at least some of those components shown in FIG. 7 such as a processor 712 and a processor 722, respectively, for example. Each of apparatus 710 and apparatus 720 may further include one or more other components not pertinent to the proposed scheme of the present disclosure (e.g., internal power supply, display device and/or user interface device), and, thus, such component(s) of apparatus 710 and apparatus 720 are neither shown in FIG. 7 nor described below in the interest of simplicity and brevity.

In one aspect, each of processor 712 and processor 722 may be implemented in the form of one or more single-core processors, one or more multi-core processors, or one or more CISC or RISC processors. That is, even though a singular term "a processor" is used herein to refer to processor 712 and processor 722, each of processor 712 and processor 722 may include multiple processors in some implementations and a single processor in other implementations in accordance with the present disclosure. In another aspect, each of processor 712 and processor 722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 712 and processor 722 is a special-purpose machine specifically designed, arranged and configured to perform specific tasks including those pertaining to improved GUTI allocation after establishment of mobile-terminated connection in mobile communications in accordance with various implementations of the present disclosure.

In some implementations, apparatus 710 may also include a transceiver 716 coupled to processor 712. Transceiver 716 may be capable of wirelessly transmitting and receiving data. In some implementations, transceiver 716 may be capable of wirelessly communicating with different types of wireless networks of different radio access technologies (RATs). In some implementations, transceiver 716 may be equipped with a plurality of antenna ports (not shown) such as, for example, four antenna ports. That is, transceiver 716 may be equipped with multiple transmit antennas and multiple receive antennas for multiple-input multiple-output (MIMO) wireless communications. In some implementations, apparatus 720 may also include a transceiver 726 coupled to processor 722. Transceiver 726 may include a transceiver capable of wirelessly transmitting and receiving data. In some implementations, transceiver 726 may be capable of wirelessly communicating with different types of UEs/wireless networks of different RATs. In some implementations, transceiver 726 may be equipped with a plurality of antenna ports (not shown) such as, for example, four antenna ports. That is, transceiver 726 may be equipped with multiple transmit antennas and multiple receive antennas for MIMO wireless communications.

In some implementations, apparatus 710 may further include a memory 714 coupled to processor 712 and capable of being accessed by processor 712 and storing data therein. In some implementations, apparatus 720 may further include a memory 724 coupled to processor 722 and capable of being accessed by processor 722 and storing data therein.

Each of memory 714 and memory 724 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 714 and memory 724 may include a type of read-only memory (ROM) such as mask ROM, programmable ROM (PROM), erasable programmable ROM (EPROM) and/or electrically erasable programmable ROM (EEPROM). Alternatively, or additionally, each of memory 714 and memory 724 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 710 and apparatus 720 may be a communication entity capable of communicating with each other using various proposed schemes in accordance with the present disclosure. For illustrative purposes and without limitation, a description of capabilities of apparatus 710, as a UE (e.g., UE 110), and apparatus 720, as a network node (e.g., network node 125) of a wireless network (e.g., wireless network 120 as a 5G/NR mobile network), is provided below.

In one aspect of improved GUTI allocation after establishment of mobile-terminated connection in mobile communications in accordance with the present disclosure, processor 712 of apparatus 710, implemented in or as UE 110, may receive, via transceiver 716, a paging message from apparatus 720 as a network node of a wireless network a network (e.g., network node 125 of wireless network 120). Additionally, processor 712 may transmit, via transceiver 716, a request to apparatus 720 in response to receiving the paging message. Moreover, processor 712 may receive, via transceiver 716, a signaling from apparatus 720 in response to the transmitting of the request, with the signaling indicating a new temporary identity of apparatus 710.

In some implementations, the new temporary identity may include a new 5G-GUTI, a new 5G-TMSI or a new 5G-S-TMSI.

In some implementations, in transmitting the request to apparatus 720, processor 712 may transmit an UL AS or NAS PDU to apparatus 720. In some implementations, in receiving the signaling, processor 712 may receive a DL AS or NAS PDU with the new temporary identity of the UE from apparatus 720.

In some implementations, in transmitting the request to apparatus 720, processor 712 may transmit an SR or a CPSR to apparatus 720. In some implementations, in receiving the signaling, processor 712 may receive a service accept message, a DL NAS transport message or a configuration update command from apparatus 720.

In some implementations, processor 712 may perform additional operations. For instance, processor 712 may acknowledge to apparatus 720 that the temporary identity is received.

In some implementations, in receiving the signaling, processor 712 may receive a service accept message. In such cases, in acknowledging to apparatus 720, processor 712 may replace an old temporary identity with the new temporary identity without transmitting a service complete message to apparatus 720.

In some implementations, in receiving the signaling, processor 712 may receive the signaling over a first NAS signaling connection. In such cases, in acknowledging to apparatus 720, processor 712 may transmit, via transceiver 716, to apparatus 720 an UL AS or NAS PDU without a temporary identity of the UE over the first NAS signaling connection.

In some implementations, in receiving the signaling, processor 712 may receive the signaling over a first NAS signaling connection. In such cases, in acknowledging to apparatus 720, processor 712 may transmit, via transceiver 716, to apparatus 720 an UL AS or NAS PDU with the new temporary identity of the UE over a second NAS signaling connection different than the first NAS signaling connection.

In some implementations, in acknowledging to apparatus 720, processor 712 may transmit, via transceiver 716, a service complete message or a configuration update complete message to apparatus 720.

In some implementation, processor 712 may also transmit, via transceiver 716, to apparatus 720 a message that includes the temporary identity as acknowledge to the wireless network that the temporary identity is received.

In another aspect of improved GUTI allocation after establishment of mobile-terminated connection in mobile communications in accordance with the present disclosure, processor 712 of apparatus 710, implemented in or as UE 110, may transmit, via transceiver 716, a request to apparatus 720 as a network node of a wireless network a network (e.g., network node 125 of wireless network 120). Moreover, processor 712 may receive, via transceiver 716, a response from apparatus 720 in response to the transmitting of the request, with the response indicating a new temporary identity of the UE.

In some implementations, the new temporary identity may include a new 5G-GUTI, a new 5G-TMSI or a new 5G-S-TMSI.

In some implementations, processor 712 may perform additional operations. For instance, processor 712 may acknowledge to apparatus 720 that the temporary identity is received.

In some implementations, in acknowledging to apparatus 720, processor 712 may transmit, via transceiver 716, an UL PDU without a temporary identity of apparatus 710 over a same NAS signaling connection over which the transmitting and the receiving are performed.

In some implementations, in acknowledging to apparatus 720, processor 712 may transmit, via transceiver 716, an initial NAS PDU with the new temporary identity of apparatus 710 over a new NAS signaling connection different from a previous NAS signaling connection over which the transmitting and the receiving are performed.

Illustrative Processes

Figure 8:
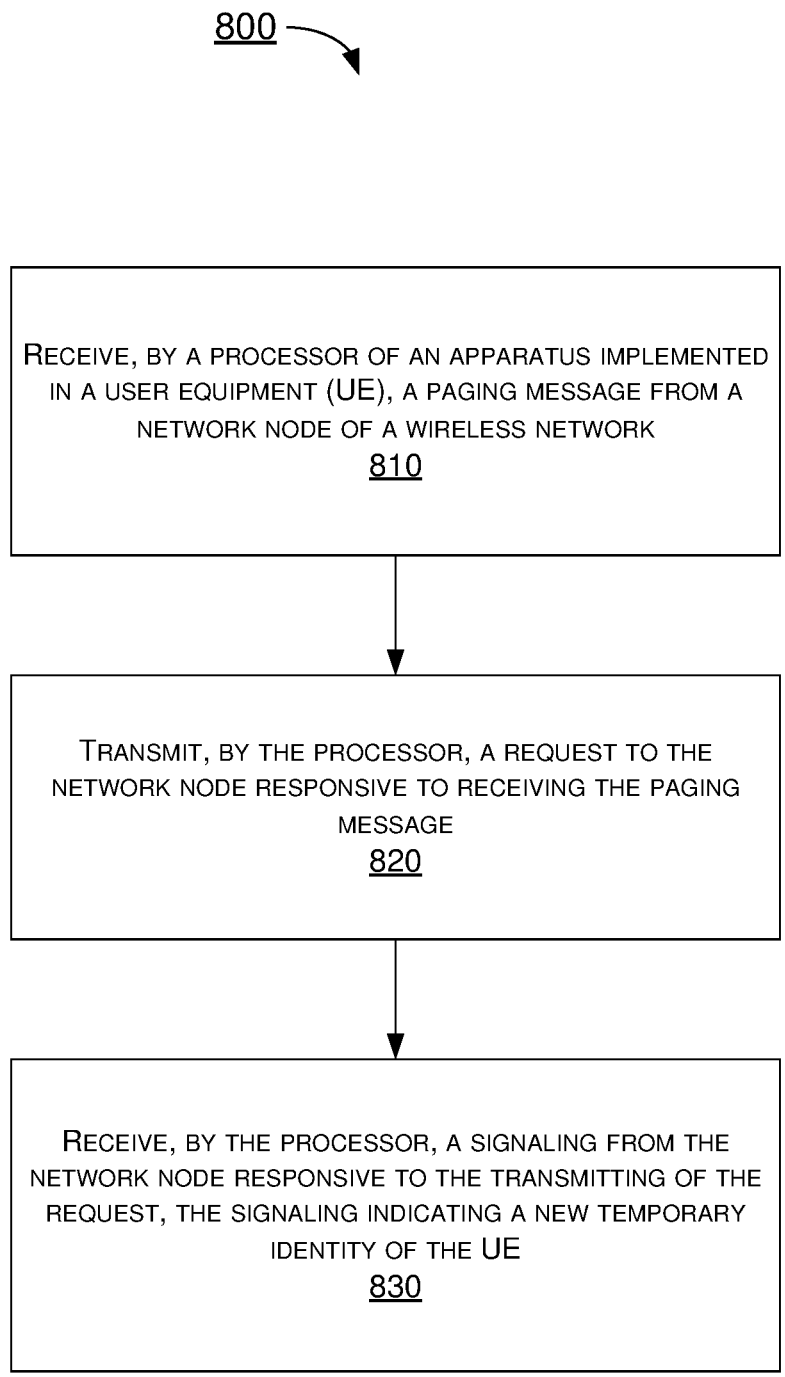
FIG. 8 is a flowchart of an example process in accordance with an implementation of the present disclosure.

FIG. 8 illustrates an example process 800 in accordance with an implementation of the present disclosure. Process 800 may represent an aspect of implementing various proposed designs, concepts, schemes, systems and methods described above, whether partially or entirely, including those pertaining to FIG. 1~FIG. 7. More specifically, process 800 may represent an aspect of the proposed concepts and schemes pertaining to improved GUTI allocation after establishment of mobile-terminated connection in mobile communications. Process 800 may include one or more operations, actions, or functions as illustrated by one or more of blocks 810, 820 and 830. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively in a different order. Furthermore, one or more of the blocks/sub-blocks of process 800 may be executed iteratively. Process 800 may be implemented by or in apparatus 710 and apparatus 720 as well as any variations thereof. Solely for illustrative purposes and without limiting the scope, process 800 is described below in the context of apparatus 710 as a UE (e.g., UE 110) and apparatus 720 as a communication entity such as a network node or base station (e.g., network node 125) of a wireless network (e.g., wireless network 120). Process 800 may begin at block 810.

At 810, process 800 may involve processor 712 of apparatus 710, implemented in or as UE 110, receiving, via transceiver 716, a paging message from apparatus 720 as a network node of a wireless network a network (e.g., network node 125 of wireless network 120). Process 800 may proceed from 810 to 820.

At 820, process 800 may involve processor 712 transmitting, via transceiver 716, a request to apparatus 720 in response to receiving the paging message. Process 800 may proceed from 820 to 830.

At 830, process 800 may involve processor 712 receiving, via transceiver 716, a signaling from apparatus 720 in response to the transmitting of the request, with the signaling indicating a new temporary identity of apparatus 710.

In some implementations, the new temporary identity may include a new 5G-GUTI, a new 5G-TMSI or a new 5G-S-TMSI.

In some implementations, in transmitting the request to apparatus 720, process 800 may involve processor 712 transmitting an UL AS or NAS PDU to apparatus 720. In some implementations, in receiving the signaling, process 800 may involve processor 712 receiving a DL AS or NAS PDU with the new temporary identity of the UE from apparatus 720.

In some implementations, in transmitting the request to apparatus 720, process 800 may involve processor 712 transmitting an SR or a CPSR to apparatus 720. In some implementations, in receiving the signaling, process 800 may involve processor 712 receiving a service accept message, a DL NAS transport message or a configuration update command from apparatus 720.

In some implementations, process 800 may involve processor 712 performing additional operations. For instance, process 800 may involve processor 712 acknowledging to apparatus 720 that the temporary identity is received.

In some implementations, in receiving the signaling, process 800 may involve processor 712 receiving a service accept message. In such cases, in acknowledging to apparatus 720, process 800 may involve processor 712 replacing an old temporary identity with the new temporary identity without transmitting a service complete message to apparatus 720.

In some implementations, in receiving the signaling, process 800 may involve processor 712 receiving the signaling over a first NAS signaling connection. In such cases, in acknowledging to apparatus 720, process 800 may involve processor 712 transmitting, via transceiver 716, to apparatus 720 an UL AS or NAS PDU without a temporary identity of the UE over the first NAS signaling connection.

In some implementations, in receiving the signaling, process 800 may involve processor 712 receiving the signaling over a first NAS signaling connection. In such cases, in acknowledging to apparatus 720, process 800 may involve processor 712 transmitting, via transceiver 716, to apparatus 720 an UL AS or NAS PDU with the new temporary identity of the UE over a second NAS signaling connection different than the first NAS signaling connection.

In some implementations, in acknowledging to apparatus 720, process 800 may involve processor 712 transmitting, via transceiver 716, a service complete message or a configuration update complete message to apparatus 720.

In some implementation, process 800 may further involve processor 712 transmitting, via transceiver 716, to apparatus 720 a message that includes the temporary identity as acknowledge to the wireless network that the temporary identity is received.

Figure 9:
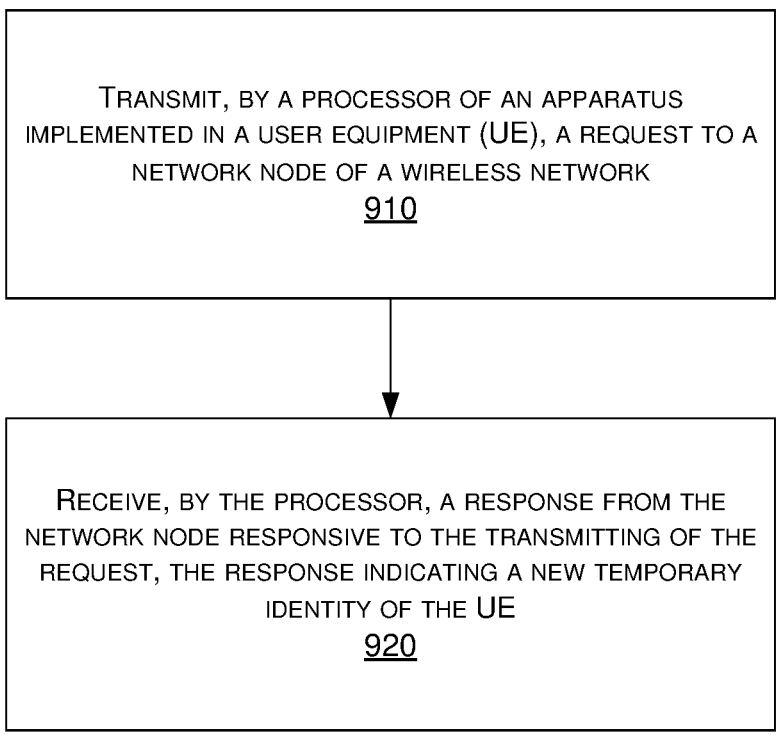
FIG. 9 is a flowchart of an example process in accordance with an implementation of the present disclosure.

FIG. 9 illustrates an example process 900 in accordance with an implementation of the present disclosure. Process 900 may represent an aspect of implementing various proposed designs, concepts, schemes, systems and methods described above, whether partially or entirely, including those pertaining to FIG. 1~FIG. 7. More specifically, process 900 may represent an aspect of the proposed concepts and schemes pertaining to improved GUTI allocation after establishment of mobile-terminated connection in mobile communications. Process 900 may include one or more operations, actions, or functions as illustrated by one or more of blocks 910 and 920. Although illustrated as discrete blocks, various blocks of process 900 may be divided into additional blocks, combined into fewer blocks, or eliminated, depending on the desired implementation. Moreover, the blocks/sub-blocks of process 900 may be executed in the order shown in FIG. 9 or, alternatively in a different order. Furthermore, one or more of the blocks/sub-blocks of process 900 may be executed iteratively. Process 900 may be implemented by or in apparatus 710 and apparatus 720 as well as any variations thereof. Solely for illustrative purposes and without limiting the scope, process 900 is described below in the context of apparatus 710 as a UE (e.g., UE 110) and apparatus 720 as a communication entity such as a network node or base station (e.g., network node 125) of a wireless network (e.g., wireless network 120). Process 900 may begin at block 910.

At 910, process 900 may involve processor 712 of apparatus 710, implemented in or as UE 110, transmitting, via transceiver 716, a request to apparatus 720 as a network node of a wireless network a network (e.g., network node 125 of wireless network 120). Process 900 may proceed from 910 to 920.

At 920, process 900 may involve processor 712 receiving, via transceiver 716, a response from apparatus 720 in response to the transmitting of the request, with the response indicating a new temporary identity of the UE.

In some implementations, the new temporary identity may include a new 5G-GUTI, a new 5G-TMSI or a new 5G-S-TMSI.

In some implementations, process 900 may involve processor 712 performing additional operations. For instance, process 900 may involve processor 712 acknowledging to apparatus 720 that the temporary identity is received.

In some implementations, in acknowledging to apparatus 720, process 900 may involve processor 712 transmitting, via transceiver 716, an UL PDU without a temporary identity of apparatus 710 over a same NAS signaling connection over which the transmitting and the receiving are performed.

In some implementations, in acknowledging to apparatus 720, process 900 may involve processor 712 transmitting, via transceiver 716, an initial NAS PDU with the new temporary identity of apparatus 710 over a new NAS signaling connection different from a previous NAS signaling connection over which the transmitting and the receiving are performed.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method implementable in mobile communications, comprising:
    receiving, by a processor of an apparatus implemented in a user equipment (UE), a signaling including a new temporary identity of the UE, which is different from an old temporary identity of the UE, from a network node of a wireless network responsive to the UE transmitting a request to the network node as a response to a paging message received from the network node; and
    either:
        acknowledging receipt of the new temporary identity by transmitting to the network node a first protocol data unit (PDU) without the new temporary identity over a same signaling connection in which the new temporary identity is received; or
        acknowledging receipt of the new temporary identity by transmitting to the network node a second PDU with the new temporary identity over a subsequent signaling connection,
    wherein the first PDU comprises a first Non-Access Stratum (NAS) or Access Stratum (AS) PDU,
    wherein the second PDU comprises a second NAS PDU or AS PDU,
    wherein the receiving of the signaling comprises receiving a SERVICE ACCEPT message, and
    wherein the acknowledging to the network node comprises replacing the old temporary identity with the new temporary identity without transmitting a SERVICE COMPLETE message to the network node.

2. The method of claim 1, wherein the new temporary identity comprises a new 5th Generation Globally Unique Temporary Identity (5G-GUTI), a new 5G Temporary Mobile Subscriber Identity (5G-TMSI) or a new 5G Serving Temporary Mobile Subscriber Identity (5G-S-TMSI).

3. The method of claim 1, wherein the transmitting of the request to the network node comprises transmitting an uplink (UL) AS or NAS PDU to the network node, and wherein the receiving of the signaling comprises receiving a DL AS or NAS PDU with the new temporary identity of the UE from the network node.

4. The method of claim 1, wherein the transmitting of the request to the network node comprises transmitting a service request (SR) or a CONTROL PLANE SERVICE REQUEST (CPSR) to the network node.

5. The method of claim 1, wherein the receiving of the signaling comprises receiving the signaling over a first NAS signaling connection.

6. The method of claim 1, wherein the acknowledging to the network node further comprises transmitting a SERVICE COMPLETE message or a CONFIGURATION UPDATE COMPLETE message to the network node.

7. The method of claim 1, further comprising:
    transmitting, by the processor, to the network node a message that includes the new temporary identity as acknowledge to the wireless network that the new temporary identity is received.

8. A method implementable in mobile communications, comprising: receiving, by a processor of an apparatus implemented in a user equipment (UE), a response from a network node of a wireless network, the response indicating a new temporary identity of the UE responsive to the UE transmitting a request to the network node as a response to a paging message received from the network node; and acknowledging receipt of the new temporary identity by transmitting to the network node a protocol data unit (PDU) without the new temporary identity over a same signaling connection in which the new temporary identity is received, wherein the receiving of the response comprises receiving a SERVICE REJECT message that includes a second PDU with the new temporary identity of the UE in an event that the UE is not deregistered by the wireless network in a service request procedure, and wherein the PDU comprises a Non-Access Stratum (NAS) or Access Stratum (AS) PDU.

9. The method of claim 8, wherein the acknowledging to the network node further comprises transmitting an uplink (UL) PDU without a temporary identity of the UE over a same NAS signaling connection over which the transmitting and the receiving are performed.

10. The method of claim 8, wherein the new temporary identity comprises a new 5th Generation Globally Unique Temporary Identity (5G-GUTI), a new 5G Temporary Mobile Subscriber Identity (5G-TMSI) or a new 5G Serving Temporary Mobile Subscriber Identity (5G-S-TMSI).

11. An apparatus implemented as a user equipment (UE), comprising:
    a transceiver configured to wirelessly communicate with a network node of a wireless network; and
    a processor coupled to the transceiver and configured to perform operations comprising:
        receiving, via the transceiver, a response from a network node of a wireless network, the response indicating a new temporary identity of the UE responsive to the UE transmitting a request to the network node as a response to a paging message received from the network node; and
        acknowledging receipt of the new temporary identity by transmitting, via the transceiver, to the network node a protocol data unit (PDU) without the new temporary identity over a same signaling connection in which the new temporary identity is received,
    wherein, in receiving the response, the processor is configured to receive a SERVICE REJECT message that includes the new temporary identity of the UE in an event that the UE is not deregistered by the wireless network in a service request procedure, and
    wherein the PDU comprises a Non-Access Stratum (NAS) or Access Stratum (AS) PDU.

12. The apparatus of claim 11, wherein, in acknowledging to the network node, the processor is further configured to transmit an uplink (UL) PDU without a temporary identity of the UE over a same NAS signaling connection over which the transmitting and the receiving are performed.

13. The apparatus of claim 11, wherein the new temporary identity comprises a new 5th Generation Globally Unique Temporary Identity (5G-GUTI), a new 5G Temporary Mobile Subscriber Identity (5G-TMSI) or a new 5G Serving Temporary Mobile Subscriber Identity (5G-S-TMSI).

\* \* \* \* \*